(12) United States Patent
Gholmieh et al.

(10) Patent No.: US 9,191,842 B2
(45) Date of Patent: Nov. 17, 2015

(54) METHODS AND APPARATUS FOR REPORTING SIGNAL QUALITY IN OVERLAPPING MULTIMEDIA BROADCAST SINGLE FREQUENCY NETWORK (MBSFN) AREAS

(71) Applicant: QUALCOMM Incorporated, San Diego, CA (US)

(72) Inventors: Ralph Akram Gholmieh, San Diego, CA (US); Daniel Amerga, San Diego, CA (US); Sivaramakrishna Veerepalli, San Diego, CA (US); Ketan Narendra Patel, Santa Clara, CA (US); Jack Shyh-Hurng Shauh, San Diego, CA (US); Kuo-Chun Lee, San Diego, CA (US); Ankur Verma, San Diego, CA (US); Gordon Kent Walker, San Diego, CA (US); Nagaraju Naik, San Diego, CA (US); Shailesh Maheshwari, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 150 days.

(21) Appl. No.: 13/940,880

(22) Filed: Jul. 12, 2013

(65) Prior Publication Data

US 2014/0016491 A1    Jan. 16, 2014

Related U.S. Application Data

(60) Provisional application No. 61/672,077, filed on Jul. 16, 2012.

(51) Int. Cl.
*H04W 24/08*    (2009.01)
*H04L 1/00*    (2006.01)
*H04L 5/00*    (2006.01)
*H04L 1/20*    (2006.01)

(52) U.S. Cl.
CPC ............... *H04W 24/08* (2013.01); *H04L 1/00* (2013.01); *H04L 1/206* (2013.01); *H04L 5/00* (2013.01)

(58) Field of Classification Search
CPC . H04W 24/08; H04W 72/005; H04W 72/085; H04W 72/1231
See application file for complete search history.

(56) References Cited

U.S. PATENT DOCUMENTS 7,782,821 B2    8/2010    Matsuo et al.
8,159,997 B2 *  4/2012    Fukunaga et al. ............ 370/321
(Continued)

FOREIGN PATENT DOCUMENTS

WO    WO-2011097855 A1    8/2011
WO    WO-2011120383 A1    10/2011

OTHER PUBLICATIONS

International Search Report and Written Opinion—PCT/US2013/050514—ISA/EPO—Dec. 16, 2013.

*Primary Examiner* — Andrew Lai
*Assistant Examiner* — Chuong M Nguyen
(74) *Attorney, Agent, or Firm* — Patterson & Sheridan, LLP

(57) ABSTRACT

Certain aspects of the present disclosure relate to methods and apparatus for reporting signal quality in overlapping Multimedia Broadcast Single Frequency Networks (MBSFN) areas. A UE may determine a signal quality estimate for each of two or more overlapping MBSFN areas based on Signal to Noise Ratio (SNR) information and Modulation and Coding Scheme (MCS) information for the MBSFN area. The UE may then determine a combined signal quality based on the signal quality estimates of the MBSFN areas.

42 Claims, 10 Drawing Sheets

(56) References Cited

U.S. PATENT DOCUMENTS

| | | |
|---|---|---|
| 8,285,291 B2 | 10/2012 | Tiwari et al. |
| 8,396,024 B2 | 3/2013 | Baum et al. |
| 2012/0236712 A1 | 9/2012 | Park et al. |
| 2013/0010624 A1* | 1/2013 | He et al. .................. 370/252 |
| 2013/0301509 A1* | 11/2013 | Purnadi et al. ............. 370/312 |

* cited by examiner

METHODS AND APPARATUS FOR REPORTING SIGNAL QUALITY IN OVERLAPPING MULTIMEDIA BROADCAST SINGLE FREQUENCY NETWORK (MBSFN) AREAS

CLAIM OF PRIORITY UNDER 35 U.S.C §119

The present Application for Patent claims priority to U.S. Provisional Application No. 61/672,077, entitled METHODS AND APPARATUS FOR REPORTING SIGNAL QUALITY IN OVERLAPPING MULTIMEDIA BROADCAST SINGLE FREQUENCY NETWORK (MBSFN) AREAS, filed Jul. 16, 2012, and assigned to the assignee hereof and hereby expressly incorporated by reference herein.

FIELD

The present disclosure relates generally to communication systems, and more particularly, to methods and apparatus for reporting signal quality in overlapping Multimedia Broadcast Single Frequency Network (MBSFN) areas.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE/LTE-Advanced is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

Certain aspects of the present disclosure provide a method for wireless communications by a User Equipment (UE). The method generally includes determining a signal quality estimate for each of two or more overlapping Multimedia Broadcast Single Frequency Network (MBSFN) areas based on Signal to Noise Ratio (SNR) information and Modulation and Coding Scheme (MCS) information for the MBSFN area, and determining a combined signal quality estimate based on the signal quality estimates of the MBSFN areas.

Certain aspects of the present disclosure provide an apparatus for wireless communication. The apparatus generally includes means for determining a signal quality estimate for each of two or more overlapping Multimedia Broadcast Single Frequency Network (MBSFN) areas based on Signal to Noise Ratio (SNR) information and Modulation and Coding Scheme (MCS) information for the MBSFN area, and means for determining a combined signal quality estimate based on the signal quality estimates of the MBSFN areas.

Certain aspects of the present disclosure provide an apparatus for wireless communication. The apparatus generally includes at least one processor and a memory coupled to the at least one processor. The at least one processor is generally configured to determine a signal quality estimate for each of two or more overlapping Multimedia Broadcast Single Frequency Network (MBSFN) areas based on Signal to Noise Ratio (SNR) information and Modulation and Coding Scheme (MCS) information for the MBSFN area, and determine a combined signal quality estimate based on the signal quality estimates of the MBSFN areas.

Certain aspects of the present disclosure provide a computer program product for wireless communication by a user equipment (UE). The computer program product generally includes a computer-readable medium comprising instruction for determining a signal quality estimate for each of two or more overlapping Multimedia Broadcast Single Frequency Network (MBSFN) areas based on Signal to Noise Ratio (SNR) information and Modulation and Coding Scheme (MCS) information for the MBSFN area, and determining a combined signal quality estimate based on the signal quality estimates of the MBSFN areas.

Numerous other aspects are provided including apparatus, systems and computer program products.

DETAILED DESCRIPTION

Figure 1:
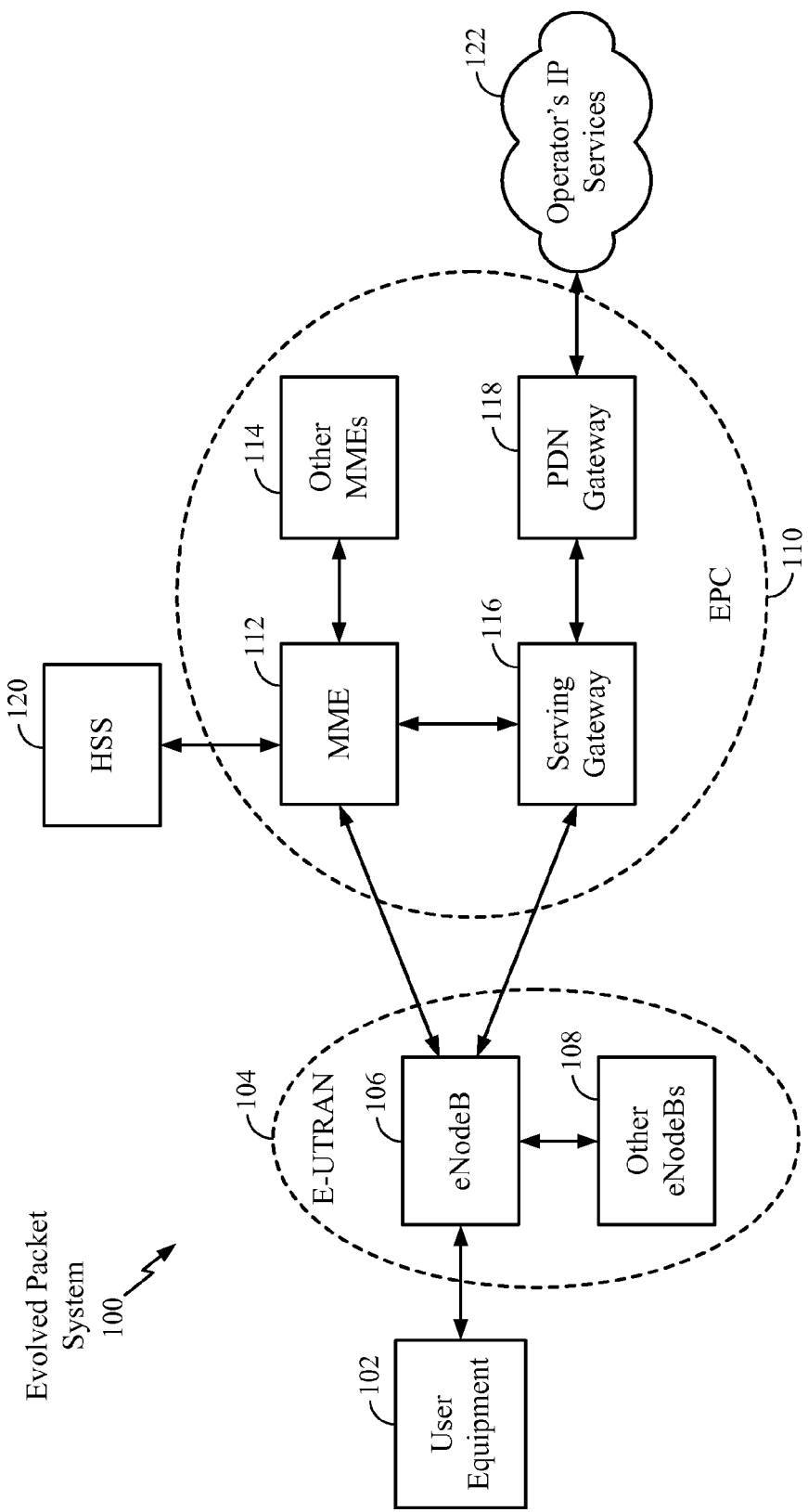
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software/firmware, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software/firmware, middleware, microcode, hardware description language, or otherwise.

Accordingly, in one or more exemplary embodiments, the functions described may be implemented in hardware, software/firmware, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. Exemplary other access networks may include an IP Multimedia Subsystem (IMS) PDN, Internet PDN, Administrative PDN (e.g., Provisioning PDN), carrier-specific PDN, operator-specific PDN, and/or GPS PDN. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control plane protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a netbook, a smart book, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include, for example, the Internet, the Intranet, an IP Multimedia Subsystem (IMS), and a PS Streaming Service (PSS). In this manner, the UE 102 may be coupled to the PDN through the LTE network.

Figure 2:
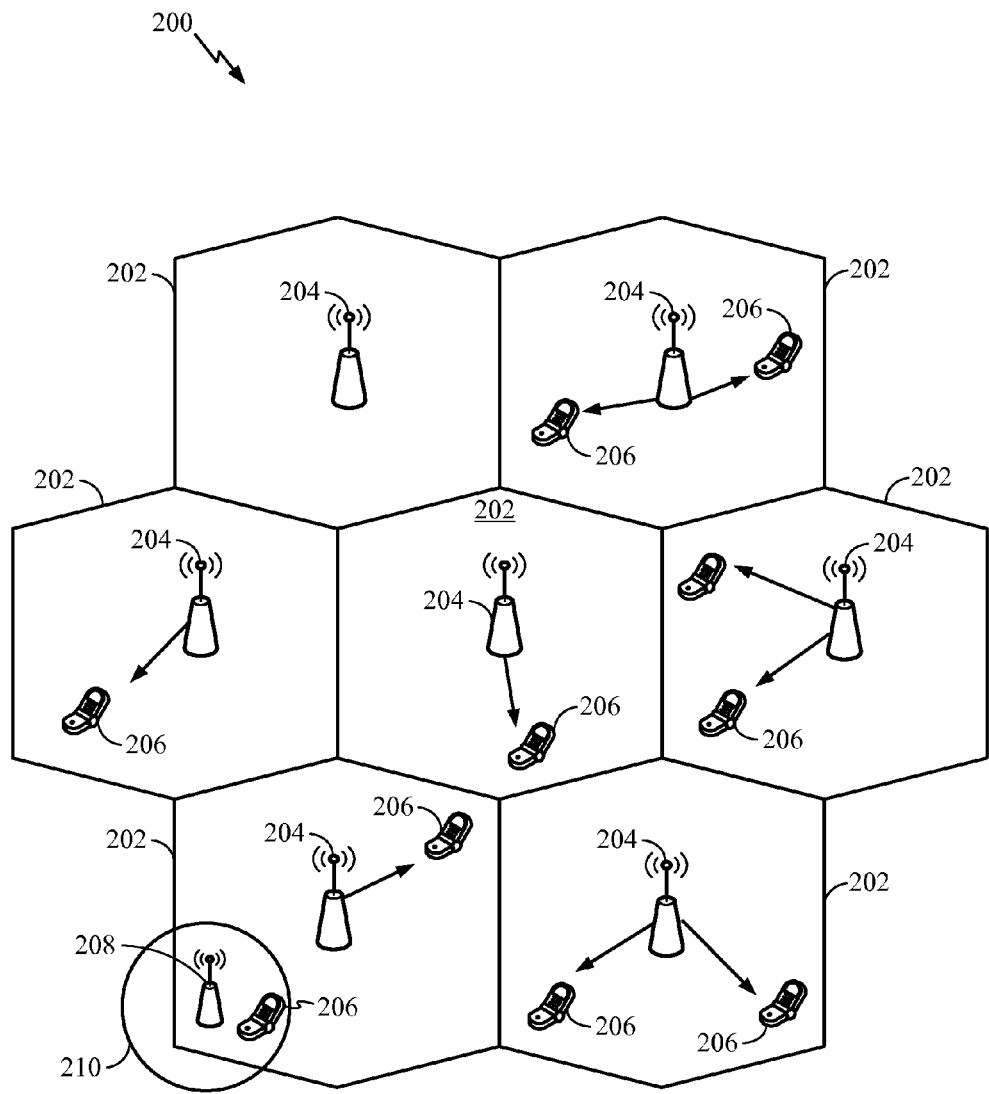
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (e.g., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
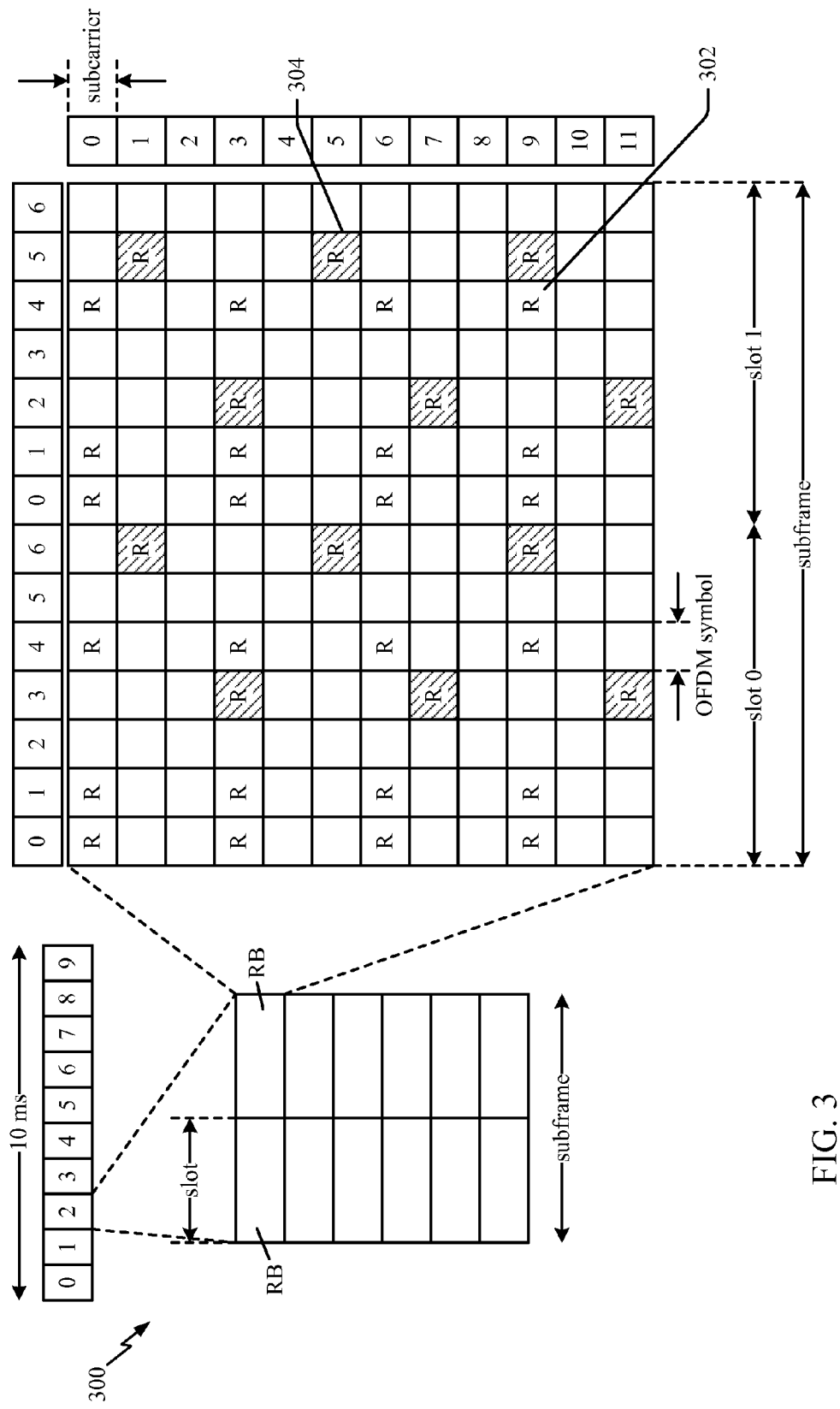
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames with indices of 0 through 9. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 4:
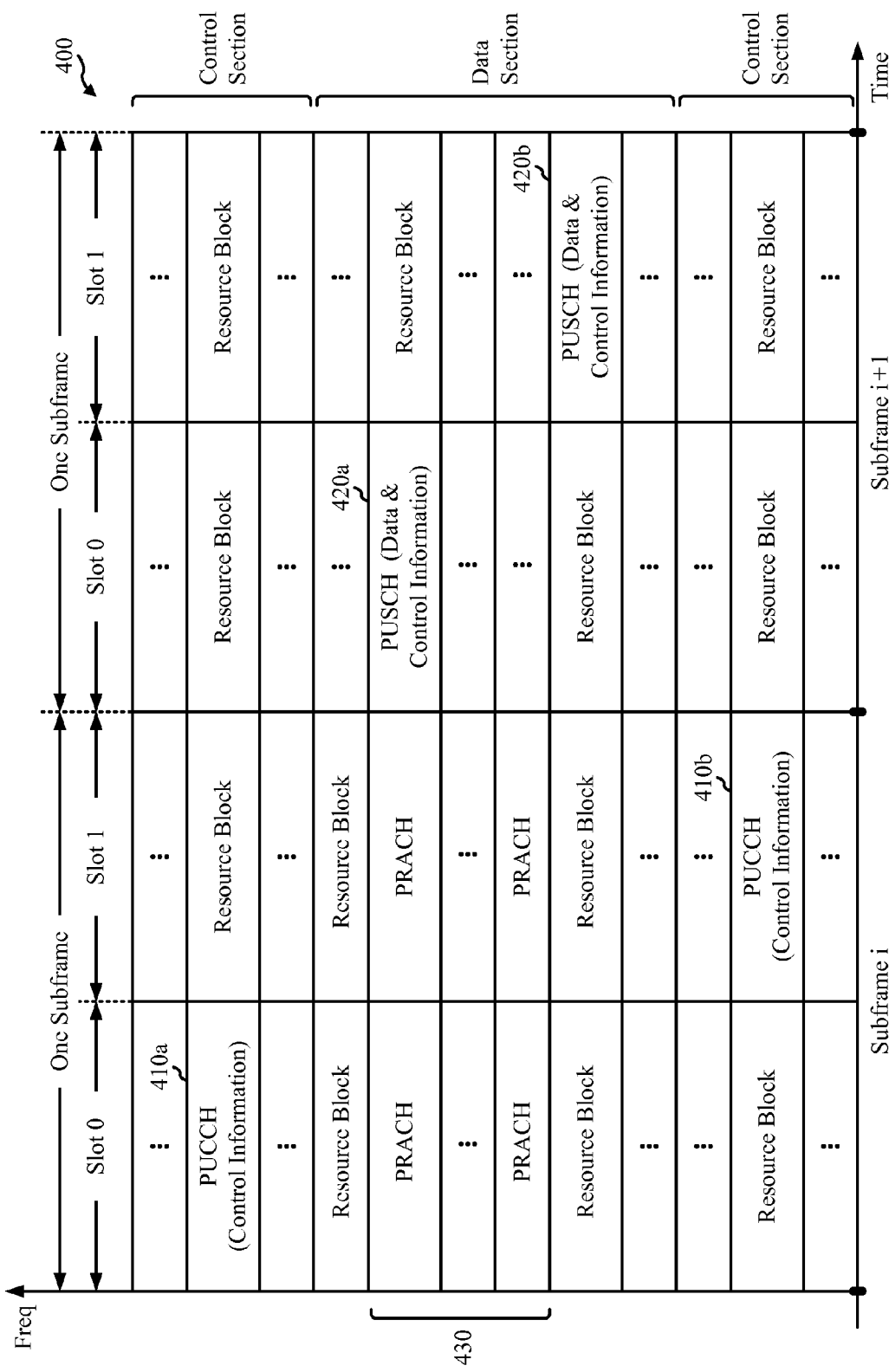
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410*a*, 410*b* in the control section to transmit control information to an eNB. The UE may also be assigned resource blocks 420*a*, 420*b* in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
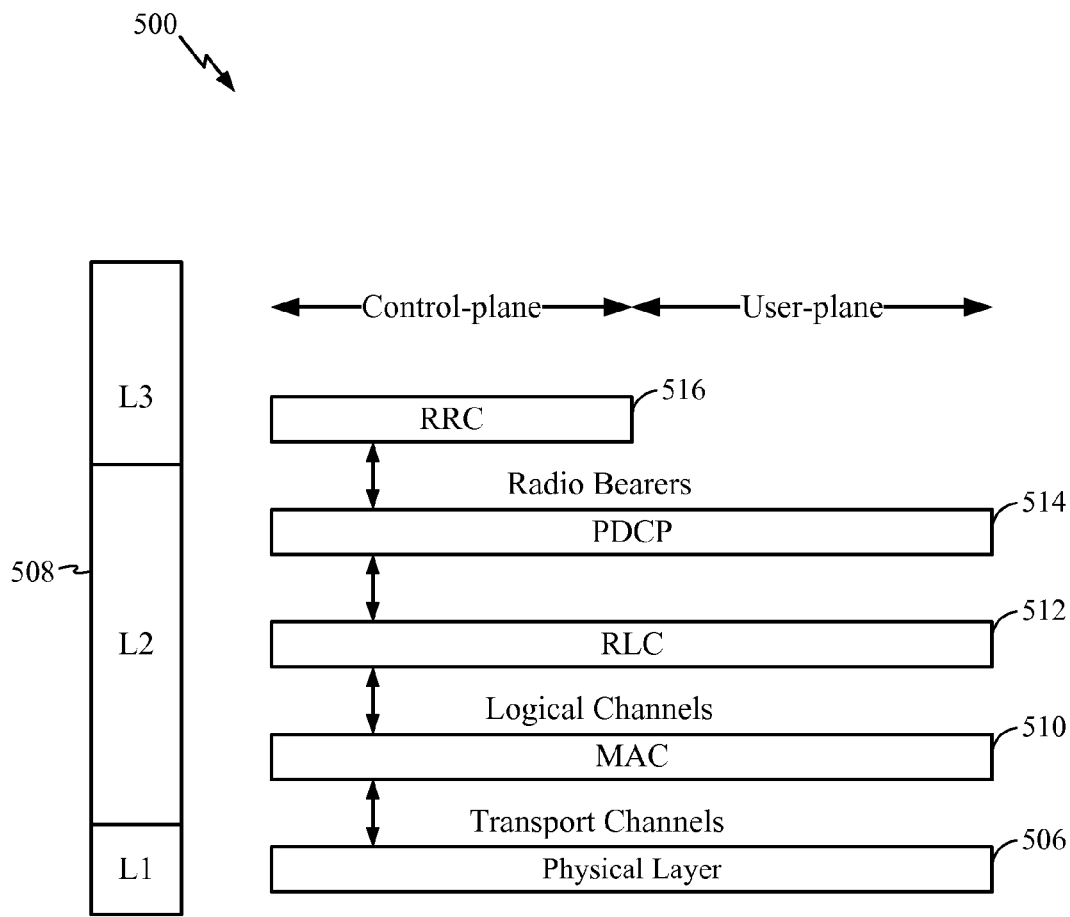
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
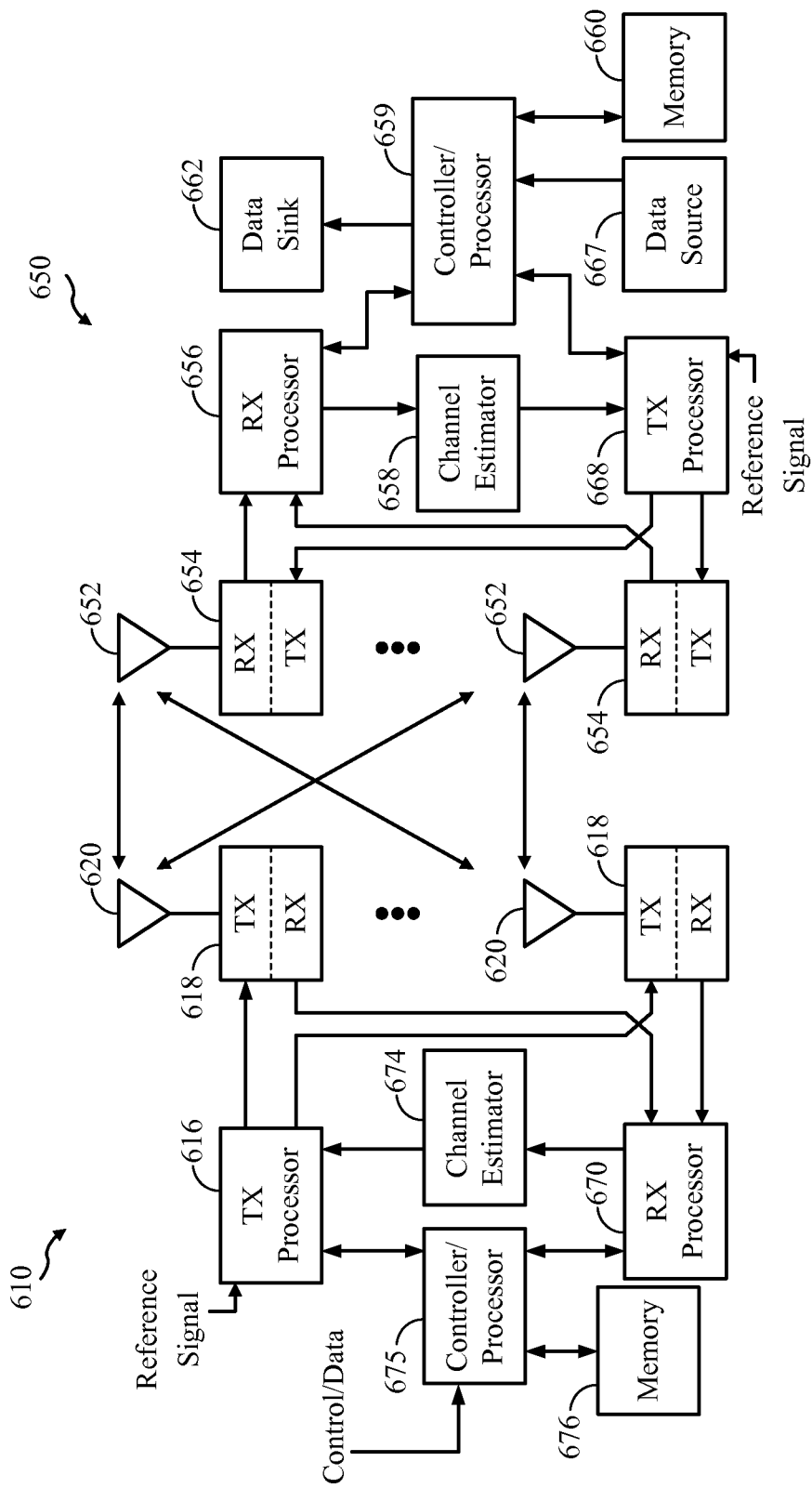
FIG. 6 is a diagram illustrating an example of an evolved Node B and user equipment in an access network, in accordance with certain aspects of the disclosure.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially pre-coded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
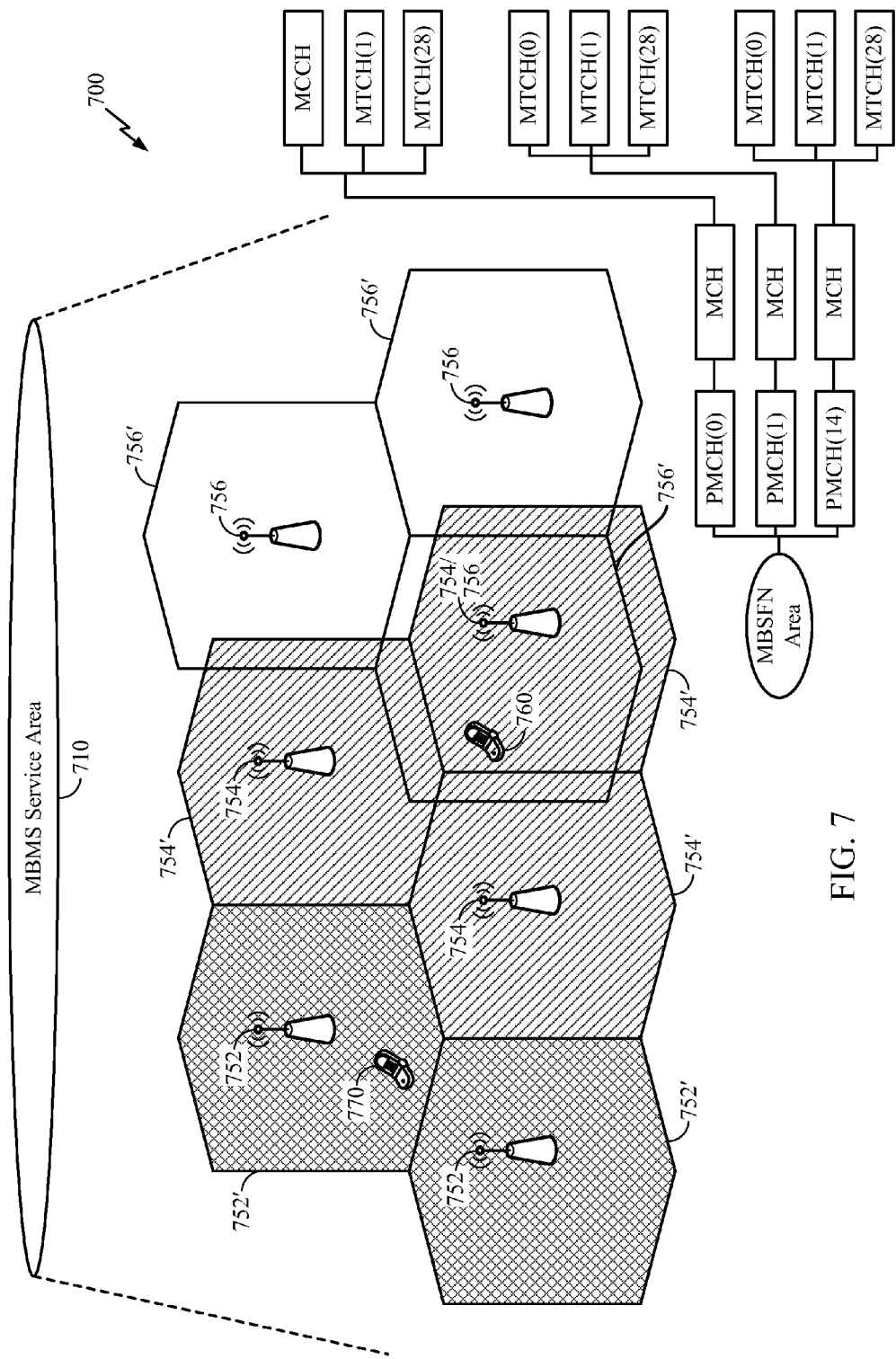
FIG. 7 illustrates a topology of a Multimedia Broadcast and Multicast Services (MBMS) service area for providing evolved Multicast Broadcast Multimedia Service (eMBMS), in accordance with certain aspects of the present disclosure.

FIG. 7 illustrates a topology 700 of a Multimedia Broadcast and Multicast Services (MBMS) service area for providing evolved Multicast Broadcast Multimedia Service (eMBMS), in accordance with certain aspects of the present disclosure. MBMS service area 710 is generally an area with eMBMS service and may be divided into one or more MBSFN areas. Each MBSFN area may be associated with one or more MBSFNs. Further, each MBSFN area is an area of eNBs which may synchronously transmit the same eMBMS control information and data. For example, the eNBs 752 in cells 752' may form a first MBSFN area, the eNBs 754 in cells 754' may form a second MBSFN area, and the eNBs 756 in cells 756' may form a third MBSFN area. The eNBs 752, 754 and 756 may be associated with other (more than one) MBSFN areas, for example, up to a total of eight MBSFN areas. As shown in FIG. 7, cells 756' of the third MBSFN area overlap with cells 754' of the second MBSFN area, and eNB 754/756 is associated with both the second and third MBSFN areas. Thus, UE 760 may receive eMBMS content from both the second and third MBSFN areas. A cell within an MBSFN area may be designated a reserved cell. Reserved cells do not provide multicast/broadcast content, but are time-synchronized to the cells 752', 754' and 756' and have restricted power on MBSFN resources in order to limit interference to the MBSFN areas. Each area may support broadcast, multicast, and unicast services. A unicast service is a service intended for a specific user, e.g., a voice call. A multicast service is a service that may be received by a group of users, e.g., a subscription video service. A broadcast service is a service that may be received by all users, e.g., a news broadcast. For example, referring to FIG. 7, the first MBSFN area may support a first eMBMS broadcast service, such as by providing a particular news broadcast to UE 770. The second MBSFN area may support a second eMBMS broadcast service, such as by providing a different news broadcast to UE 760. Further, an MBSFN area may be used to broadcast venue, regional and/or national contents. The size of an MBSFN area may be as small as one cell in case of an in-venue broadcast. Each MBSFN area supports a plurality of physical multicast channels (PMCH) (e.g., 15 PMCHs). Each PMCH corresponds to a multicast channel (MCH). Each MCH can multiplex a plurality (e.g., 29) of multicast logical channels. Each MBSFN area may have one multicast control channel (MCCH). As such, one MCH may multiplex one MCCH and a plurality of multicast traffic channels (MTCHs) and the remaining MCHs may multiplex a plurality of MTCHs.

Figure 8:
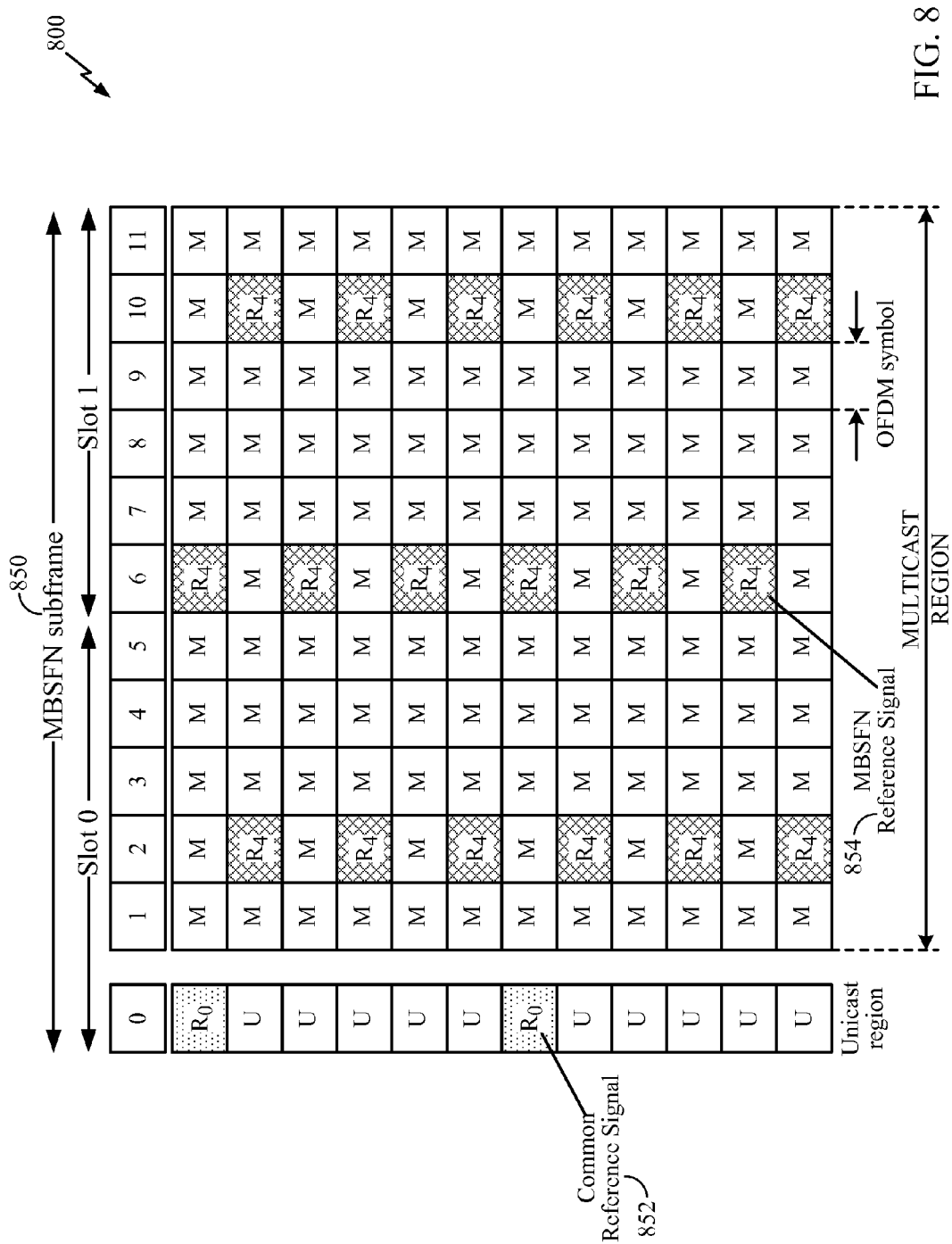
FIG. 8 is a diagram illustrating an example of a MBSFN downlink subframe in LTE, in accordance with certain aspects of the present disclosure.

FIG. 8 is a diagram 800 illustrating an example of a MBSFN downlink subframe in LTE, in accordance with certain aspects of the present disclosure. An LTE frame of 10 ms in length may be divided into ten equally sized sub-frames 850 with indices 0 to 9. Each sub-frame 850 may include two consecutive time slots, slot 0 and slot 1. A resource grid may be used to represent the two time slots, each time slot including a resource block. The resource grid is divided into multiple resource elements. In LTE, a resource block contains twelve consecutive subcarriers in the frequency domain. Each resource block in an MBSFN subframe contains six consecutive OFDM symbols in the time domain. Each MBSFN subframe is divided into a unicast region (consisting of 1 or 2 OFDM symbols) followed by a multicast region (consisting of the remaining 11 or 10 OFDM symbols). The MBSFN symbols, which comprise the multicast region, always use an extended cyclic prefix. The unicast symbols, which comprise the unicast region, may use either normal or extended cyclic prefix. In case of the unicast symbols using a normal cyclic prefix, there will be a gap between the unicast and multicast regions. Some of the resource elements may include downlink reference signals (DL-RS). The DL-RS may include Cell-Specific RS (CRS) 852 (also sometimes called as Common RS) and MBSFN RS 854. The CRS is typically transmitted only in the unicast portion of the MBSFN subframe, while the MBSFN RS in only transmitted in the multicast portion of the subframe. The number of bits carried by each resource element depends on the modulation scheme used. Thus, higher the modulation scheme, higher is the data rate for the UE.

Example Methods and Apparatus for Reporting Signal Quality in Overlapping Multimedia Broadcast Single Frequency Network (MBSFN) Service Areas A Multimedia Broadcast and Multicast Service (MBMS) service area is an area providing one or more Enhanced MBMS (eMBMS) services. An MBMS service area may be divided into one or more Multimedia Broadcast Single Frequency Network (MBSFN) areas. Each MBSFN area typically includes one or more eNBs which may be used for synchronized transmission of the same eMBMS content in the MBSFN area. An MBSFN area may be used to broadcast different eMBMS services. In an aspect, the size of an MBSFN area may be as small as one cell.

In certain aspects, a service area may include two or more overlapping MBSFN areas. Thus a UE positioned where MBSFN areas overlap may receive eMBMS services from each MBSFN in the service area. Network operators may require that a UE show a single (e.g., combined) signal strength/quality for all overlapping MBSFN areas as part of the annunciator, as showing individual signal strengths for each MBSFN area may not be possible, e.g., due to display size constraints. Additionally, one or more applications at the UE may need to be provided with the single signal quality of the MBSFN areas in the service area upon request or periodically. In certain aspects, the application layer is not aware of MBSFN areas and only knows a set of services available in a service area. Thus, an application may not know which particular MBSFN area or set of MBSFN areas is delivering a required set of services. Therefore, an application may only request one signal level to serve as an indicator of whether the UE may receive services and at what quality. Thus, there is a need for techniques for determining a single signal quality estimate of all MBSFN areas in a particular MBMS service area.

In certain aspects signals relating to each MBSFN area (e.g., to an MBSFN associated with the MBSFN area) may have different signal strengths, for example, due to different interference levels. Further, each MBSFN area (e.g., at least one MBSFN associated with the MBSFN area) may use different modulation and coding schemes (MCS) than another MBSFN area, with each MCS requiring a different Signal to Noise Ratio (SNR) level to ensure traffic transmitted using the MCS is reliably received. For example, a traffic channel being transmitted at a particular MCS may not be reliably received at an SNR that is lower than the SNR required to receive the traffic at this MCS. For example, MCS 0 may require an SNR of 3 dBs, while MCS 21 may require an SNR of 14 dBs. Thus, unlike unicast signals, the SNRs relating to each MBSFN signal, by themselves, may not be a good indicator of a signal level and may not be directly translated into signal quality estimates (or signal levels). In an aspect, the higher the received SNR is above the required SNR for receiving a signal at a particular MCS, the higher the determined signal quality level.

In certain aspects, in order to determine a single signal quality estimate for all overlapping MBSFN areas in which the UE is present, a UE may obtain SNR information and MCS information for each MBSFN area and determine a signal quality estimate for the MBSFN area based on the SNR and MCS information. The UE may then determine a combined signal quality estimate based on the quality estimates of the individual MBSFN areas.

In certain aspects, at a UE, a modem may calculate and provide different signal levels for different MBSFN areas to a middleware. The middleware may then combine the individual signal levels and provide a single signal level reading to an application. The application may request a signal level for eMBMS from the middleware, which in turn may request the modem for a signal level.

In certain aspects, an application running at the UE may require an SNR, excess SNR or a signal level to be reported per service. In an aspect, such a report regarding a particular service may be reported to the particular application that activated the service or to all applications at the UE. In certain aspects, the consolidated single signal level provided to an application as noted above may include one or more per service reports corresponding to one or more services activated by the application.

The UE may obtain the MCS information (e.g., including one or more MCSs used for transmitting traffic channels) for each MBSFN area from a Multicast Control Channel (MCCH) corresponding to the MBSFN area, which is transmitted at known periodic intervals.

In an active mode, a UE (e.g., the L1 layer) measures SNR of every MBSFN subframe when receiving eMBMS. Also, the UE reads (e.g., constantly) the control channels (e.g., MCCH) for each MBSFN. Thus, in an active mode, the SNR information and MCS information for each MBSFN area in a service area is readily available to the UE, which it may use to determine individual signal quality levels, and subsequently, a combined signal quality level.

However in the idle mode, when the UE is not receiving eMBMS, it may be prohibitively expensive to determine SNR for each MBSFN subframe. In certain aspects, there may be two alternatives for estimating SNR for each MBSFN area in an idle mode.

In a first alternative, a UE may measure a unicast signal SNR from a serving base station (e.g., associated with one or more MBSFN areas). The unicast signal SNR is typically measured every three seconds. Advantages of using the unicast SNR may include no additional power consumption to measure SNR and that the unicast SNR may be a lower bound on the SNR for the one or more MBSFN areas.

However, there may be limitations to using the unicast SNR. In an aspect, the unicast SNR may be an inaccurate indication of the MBSFN SNR for the one or more MBSFN areas. In general, it is expected that the unicast SNR is a lower bound on the MBSFN SNR for the one or more MBSFN areas. Thus, the UE may translate the SNR into zero bars indicating no signal strength for the one or more MBSFN areas, while service may be available. On the other hand, the unicast SNR may in certain situations be an upper bound on the MBSFN SNR for the one or more MBSFN areas, for example, when two MBSFNs interfere with each other and the unicast interference is low. In such cases, the unicast SNR may translate into a higher than actual MBSFN signal strength for the one or more MBSFN areas. In addition, the UE may read MCCHs to determine MCS information for each of the one or more MBSFN areas in order to translate the measured SNR into a signal level. Alternatively, the UE may use the signaling MCS used for the control channel and/or signaled in the system information to determine an estimate of the signal quality. In certain aspects, the UE may use the signaling MCS used for the traffic channel. However, it may be noted that the MCS used for the traffic channel may be several MCS levels less robust than the MCS used for the MCCH control channel.

In a second alternative, the UE may measure SNR of the MCCHs for all overlapping MBSFN areas in which the UE is present. In an aspect, the SNR for an MCCH may be calculated from MBSFN reference signals of MBSFN subframes (as discussed above with reference to FIG. 8) that carry the MCCH for a particular MBSFN (e.g., associated with an MBSFN area). Advantages of measuring SNR of MCCHs may include higher accuracy and consistent measurement procedure with eMBMS idle or active. However, since the SNRs for the MCCHs are not currently measured in the eMBMS idle mode, there may be additional current consumption to measure SNRs. Further, the L1 layer may employ a new measurement procedure when Temporary Mobile Group Identities (TMGIs, e.g., traffic channel identifiers) are not active.

In a third alternative, the UE may measure SNR of a data channel, for example the Multicast Traffic Channel (MTCH) for an MBSFN (e.g., associated with an MBSFN area), when one or more services in the MBSFN are active.

Figure 9:
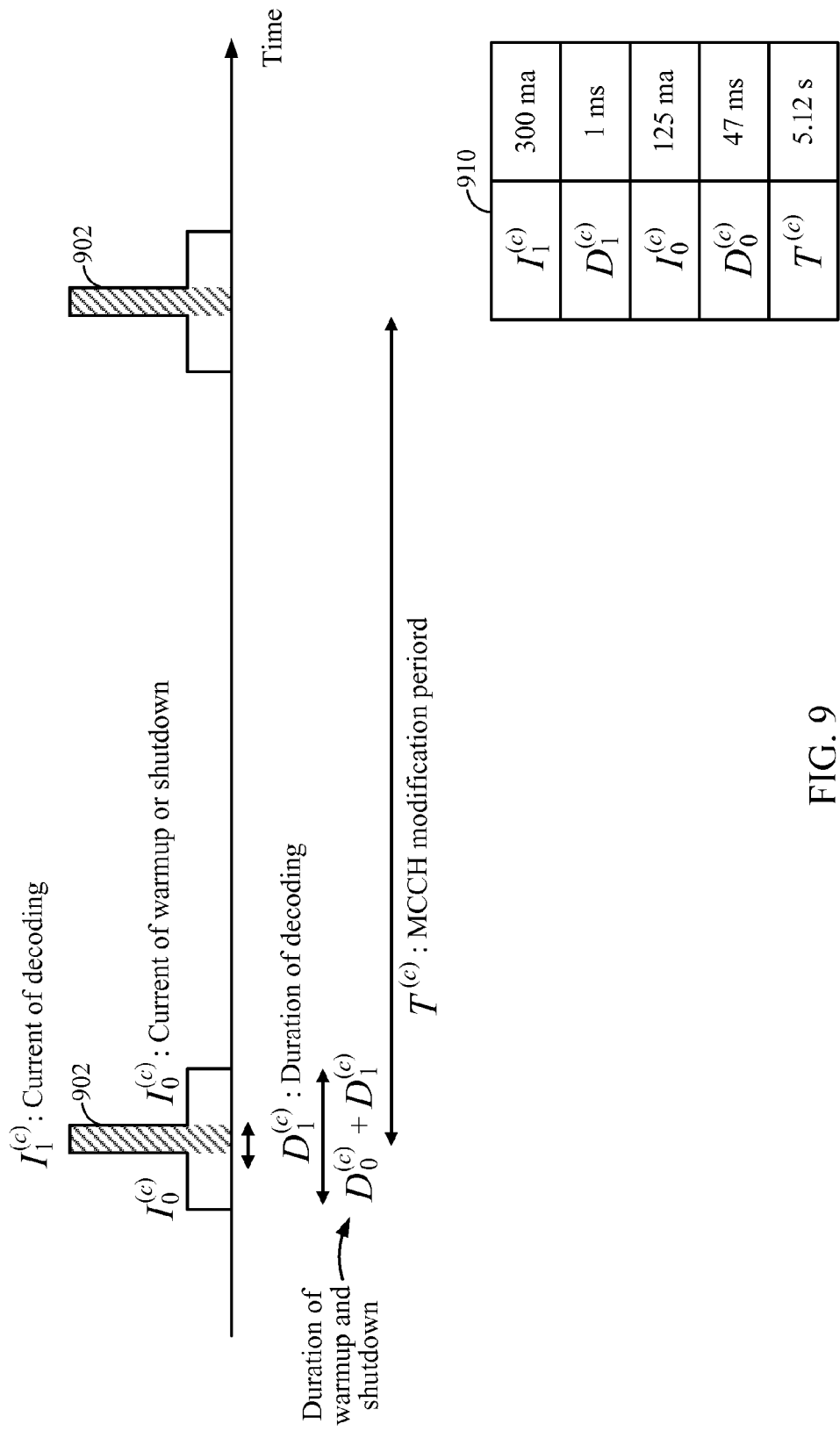
FIG. 9 illustrates time required and current consumed for monitoring one MCCH, in accordance with certain aspects of the present disclosure.

FIG. 9 illustrates time required and current consumed for monitoring one MCCH, in accordance with certain aspects of the present disclosure. FIG. 9 shows two MCCH instances 902 separated by a time duration of $T^{(c)}$. The MCCH is transmitted with a periodicity of $T^{(c)}$. $D_1^{(c)}$ represents a time duration for decoding one MCCH instance 902 and $I_1^{(c)}$ represents the current consumed to decode the decoding instance 902. In certain aspects, while in the eMBMS idle mode, a device implementing MBMS services may consume time and current (or energy) resources to wake up for decoding an MCCH instance 902 and to shut down after decoding the MCCH instance 902. For example, a chip implementing an eMBMS standard may consume time and current resources to wake up and shutdown during an idle mode. $D_0^{(c)}$ represents the time taken for wake up and shutdown for monitoring each MCCH instance. $I_0^{(c)}$ represents the current consumed for wake up and shutdown. Table 910 shows example values that may be taken by the above parameters.

In certain aspects, the SNR of an MCCH instance 902 may be measured in conjunction with decoding the MCCH instance 902. In an aspect, the current/energy required to measure SNR of one MCCH approximately every five seconds is 1.6 mA.

In certain aspects, MCCHs corresponding to different MBSFNs (e.g., each of which associated with an MBSFN area) may be transmitted with different periodicities. Further all MCCHs corresponding to all MBSFNs are typically transmitted within a window based on 10 frames (e.g., 110 msec), each MCCH being transmitted with its own periodicity. The periodicities for transmission of the MCCHs may include, for example, 160 ms, 320 ms, 640 ms, 1.28 s, 2.56 s and 5.12 s. In an aspect, the largest periodicity of the MCCH periodicities available in a service area (e.g., available for all overlapping MBSFNs in which the UE is present) may be selected (e.g., 5.12 s). Although additional and/or different periodicities may be employed. The UE may wake up with this largest periodicity and all other MCCHs will be broadcasted within 10 to 110 ms (next 100 ms) of the MCCH corresponding to the selected periodicity. This is because the periodicities for all other MCCHs are generally divisors of the chosen MCCH, and MCCH repetitions are anchored to frame number 0 at offsets of 0 to 10 frames. Thus, if the UE wakes up with the periodicity of the largest MCCH periodicity for a window of 110 ms, it may be able to measure all MCCHs for all MBSFNs in the service area. For example, if the highest periodicity of the MCCHs to be measured is 1.28 s, then UE may wake up, for example, every 1.28 s (or at integer multiples of 1.28 s) for 110 ms to measure all MCCHs to be measured.

For an example scenario, when the SNRs for three different MCCHs needs to be measured, the energy/current to decode three MBSFNs may be calculated as:

$$3*1 \text{ ms (for each subframe)}*400 \text{ mA } (I_1^{(c)}) = 1200 \text{ mA ms}$$

As discussed above, the worst case wake up duration to cover the three MCCHs may be 110 ms. However, the UE may have to take into consideration the wake-up and shutdown times for every measurement/decoding instance. Thus, a total wake-up time including power-up/power-down may be calculated as:

$$50 \text{ ms } (D_0^{(c)}) + 110 \text{ ms} = 160 \text{ ms}$$

Thus, the energy/current required to decode the three MCCHs may be given by:

$$160 \text{ ms}*150 \text{ mA } (I_0^{(c)}) + 1200 \text{ mA ms} = 25200 \text{ mA ms}$$

In an aspect, the average current consumption for monitoring the MCCHs every 5 seconds is approximately 5 mA. If measurement is only done when an application requesting or requiring the MBSFN signal level is active, a worst case of approximately 5 mA current consumption may be acceptable.

In certain aspects, an application may be configured to request for a measurement (e.g., of the SNR of Multicast Control Channels (MCCHs) for each MBSFN area) only periodically. In an aspect, the periodicity may be a multiple of the longest available MCCH periodicity for all overlapping MBSFN areas in which the UE is present (e.g., 5.12 ms).

In an alternative aspect, if the modem receives a measurement request from an application in between its periodic measurement instances, the modem may wait until the next scheduled measurement instance for measurement and reporting back to the application.

In certain aspects, multiple signal levels may be defined for reporting a single signal quality estimate. For example, signal levels 0-5 may be defined as follows:

Level 0: no coverage, or no MBSFN may be received at minimum acceptable quality.

Level 1: UE may decode at least one service at minimum acceptable quality. If multiple MBSFNs are present, then at least one MBSFN may be received.

Level 2: May decode all Multicast Traffic Channels (MTCHs) in all listed MBSFNs in a current cell.

Levels 3 to 5: Improved coverage (higher quality reception with lesser errors) based on hardest to decode MBSFN signal. Higher the level higher the quality of reception.

In an aspect, a highest MBSFN area signal level may be used as the combined signal level. In another aspect, an average signal level of the available MBSFN area signal levels may be used. In another aspect, signal level of the first listed MBSFN and/or the MBSFN area associated with the MBSFN) may be used as the combined signal level. In an aspect, for levels 2-5, the lowest signal level amongst all MBSFNs may be used as the combined signal level.

In an alternative aspect, pre-determined combined SNR levels may be mapped to each of the five signal quality levels. Although signal levels Level 0-5 are described above, additional and/or different levels may be employed.

In certain aspects, the UE may only report on the combined signal levels of the MBSFN areas based on the MBSFNs carrying the active channels in the associated MBSFN areas. In this case, the reported signal level may change on any change in the list of active channels.

In certain aspects, the single signal quality estimate may be based on an average of the respective estimated signal qualities for the MBSFN areas, a maximum of the estimated signal qualities for the MBSFN areas, or an estimated signal quality of a first MBSFN area in a list.

Figure 10:
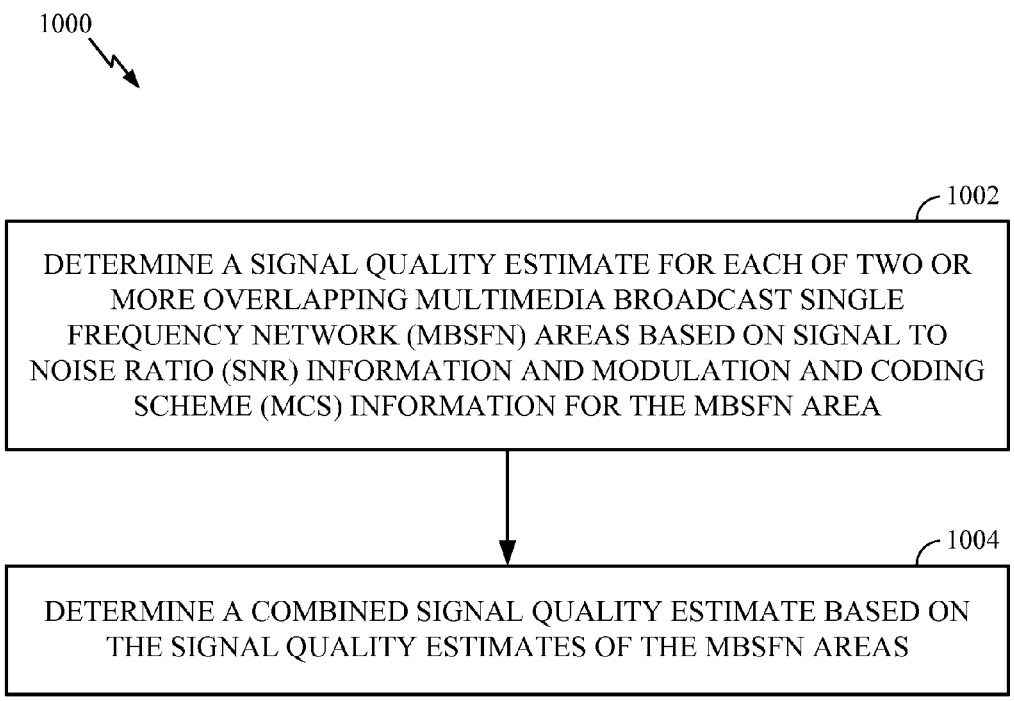
FIG. 10 shows a flow diagram illustrating operations performed by a user equipment (UE) for determining a single signal quality estimate for overlapping MBSFNs areas, in accordance with certain aspects of the present disclosure.

FIG. 10 shows a flow diagram illustrating operations 1000 performed by a user equipment (UE) for determining a single signal quality estimate for overlapping MBSFN areas, in accordance with certain aspects of the present disclosure. Operations 1000 may begin, at 1002, by determining a signal quality estimate for each of two or more overlapping MBSFN areas based on SNR information and MCS information for the MBSFN area. At 1004, a combined signal quality may be estimated based on the signal quality estimates of the MBSFN areas.

In certain aspects, the UE may measure SNR for a plurality of MBSFN subframes when receiving one or more MBMS services. In certain aspects, the UE may measure the SNR of a unicast signal received from a serving base station when in an MBMS idle mode.

In certain aspects, the UE may measure SNR of MCCHs for each MBSFN when in a MBMS idle mode. In an aspect, the SNR of an MCCH may be measured based on at least one MBSFN reference signal of one or more MBSFN subframes carrying the MCCH for a particular MBSFN area. In an aspect, the UE may configure an application to request the measuring of the SNR of the MCCHs for each MBSFN area with a periodicity that is a multiple of the longest MCCH periodicity. In an aspect, measuring the SNR of the MCCH may include determining a periodicity of an MCCH transmitted with the longest periodicity, determining a wakeup window during which all MCCHs are transmitted based on the determined periodicity, and waking up the UE for measuring the SNR of the MCCHs with the determined periodicity for a duration of the determined wakeup window. In an aspect, the measurement may be performed only when an application requiring the SNR information is active.

In certain aspects, operations the UE may read the MCS information for each MBSFN area from a MCCH for the MBSFN area.

In certain aspects, the UE may translate the combined signal quality estimate into at least one signal quality level, each signal quality level indicating a combined quality of reception for the MBSFN areas. In an aspect, the MBSFN areas may include MBSFN areas that are carrying eMBMS content currently being consumed by the UE. In an aspect, the UE may provide information relating to the at least one signal quality level to an application layer. In an aspect, the UE may report the at least one signal quality level to an application with a periodicity that is a multiple of the longest MCCH periodicity. In an aspect, the UE may configure an application to request the at least one signal quality level with a periodicity that is a multiple of the longest MCCH periodicity.

In certain aspects, the UE may read the MCS information for a MCCH of an MBSFN area from cell SIB 13.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

As used herein, a phrase referring to "at least one of" a list of items refers to any combination of those items, including single members. As an example, "at least one of: a, b, or c" is intended to cover: a, b, c, a-b, a-c, b-c, and a-b-c.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication by a user equipment (UE) comprising:
   determining, by the UE, a signal quality estimate for each of two or more overlapping Multimedia Broadcast Single Frequency Network (MBSFN) areas based on Signal to Noise Ratio (SNR) information and Modulation and Coding Scheme (MCS) information for the MBSFN area; and
   determining, by the UE, a combined signal quality estimate based on the signal quality estimates of the MBSFN areas.

2. The method of claim 1, wherein determining the signal quality estimate for each MBSFN area comprises:
   measuring SNR for a plurality of MBSFN subframes when receiving one or more Multimedia Broadcast and Multicast Services (MBMS).

3. The method of claim 1, wherein determining the signal quality estimate for each MBSFN area comprises:
   measuring SNR of a unicast signal received from a serving base station when in a Multimedia Broadcast and Multicast Services (MBMS) idle mode.

4. The method of claim 1, wherein determining the signal quality estimate for each MBSFN area comprises:
   measuring SNR of Multicast Control Channels (MCCHs) for each MBSFN area when in a Multimedia Broadcast and Multicast Services (MBMS) idle mode.

5. The method of claim 4, wherein the SNR of an MCCH is measured based on at least one MBSFN reference signal of one or more MBSFN subframes carrying the MCCH for a particular MBSFN area.

6. The method of claim 4 further comprising configuring an application to request the measuring of the SNR of the MCCHs for each MBSFN area with a periodicity that is a multiple of the longest MCCH periodicity.

7. The method of claim 4, wherein measuring the SNR of the MCCHs comprises:
determining a periodicity of an MCCH transmitted with the longest periodicity;
determining a wakeup window during which all MCCHs are transmitted based on the determined periodicity; and
waking up the UE for measuring the SNR of the MCCHs with the determined periodicity for a duration of the determined wakeup window.

8. The method of claim 7, wherein the measurement is performed only when an application requiring the SNR information is active.

9. The method of claim 1, further comprising reading the MCS information for each MBSFN area from a Multicast Control Channel (MCCH) for the MBSFN area.

10. The method of claim 1, further comprising:
translating the combined signal quality estimate into at least one signal quality level, each signal quality level indicating a combined quality of reception for the MBSFN areas.

11. The method of claim 10, wherein the MBSFN areas include MBSFN areas that are carrying evolved Multicast Broadcast Multimedia Service (eMBMS) content currently being consumed by the UE.

12. The method of claim 10, further comprising providing information relating to the at least one signal quality level to an application layer.

13. The method of claim 12, further comprising:
reporting the at least one signal quality level to an application with a periodicity that is a multiple of the longest Multicast Control Channel (MCCH) periodicity.

14. The method of claim 12, further comprising:
configuring an application to request the at least one signal quality level with a periodicity that is a multiple of the longest Multicast Control Channel (MCCH) periodicity.

15. The method of claim 1, further comprising:
reading the MCS information for a Multicast Control Channel (MCCH) of an MBSFN area from a cell System Information Block 13 (SIB 13).

16. The method of claim 1, wherein the combined signal quality estimate includes signal quality of one or more Multimedia Broadcast and Multicast Services (MBMS) services.

17. The method of claim 16, wherein the combined signal quality estimate including the signal quality of the one or more MBMS services is reported to an application at the UE that activated the one or more services.

18. An apparatus for wireless communication comprising:
means for determining a signal quality estimate for each of two or more overlapping Multimedia Broadcast Single Frequency Network (MBSFN) areas based on Signal to Noise Ratio (SNR) information and Modulation and Coding Scheme (MCS) information for the MBSFN area; and
means for determining a combined signal quality estimate based on the signal quality estimates of the MBSFN areas.

19. The apparatus of claim 18, wherein the means for determining the signal quality estimate for each MBSFN area is configured to:
measure SNR for a plurality of MBSFN subframes when receiving one or more Multimedia Broadcast and Multicast Services (MBMS).

20. The apparatus of claim 18, wherein the means for determining the signal quality estimate for each MBSFN area is configured to:
measure SNR of a unicast signal received from a serving base station when in a Multimedia Broadcast and Multicast Services (MBMS) idle mode.

21. The apparatus of claim 18, wherein the means for determining the signal quality estimate for each MBSFN area is configured to:
measure SNR of Multicast Control Channels (MCCHs) for each MBSFN area when in a Multimedia Broadcast and Multicast Services (MBMS) idle mode.

22. The apparatus of claim 21, wherein the SNR of an MCCH is measured based on at least one MBSFN reference signal of one or more MBSFN subframes carrying the MCCH for a particular MBSFN area.

23. The apparatus of claim 21, further comprising:
means for configuring an application to request the measuring of the SNR of the MCCHs for each MBSFN area with a periodicity that is a multiple of the longest MCCH periodicity.

24. The apparatus of claim 21, wherein the means for determining the signal quality estimate for each MBSFN area is configured to measure the SNR of the MCCHs by:
determining a periodicity of an MCCH transmitted with the longest periodicity;
determining a wakeup window during which all MCCHs are transmitted based on the determined periodicity; and
waking up the apparatus for measuring the SNR of the MCCHs with the determined periodicity for a duration of the determined wakeup window.

25. The apparatus of claim 24, wherein the measurement is performed only when an application requiring the SNR information is active.

26. The apparatus of claim 18, further comprising:
means for reading the MCS information for each MBSFN area from a Multicast Control Channel (MCCH) for the MBSFN area.

27. The apparatus of claim 18, further comprising:
means for translating the combined signal quality estimate into at least one signal quality level, each signal quality level indicating a combined quality of reception for the MBSFN areas.

28. The apparatus of claim 27, wherein the MBSFN areas include MBSFN areas that are carrying evolved Multicast Broadcast Multimedia Service (eMBMS) content currently being consumed by the apparatus.

29. The apparatus of claim 27, further comprising:
means for providing information relating to the at least one signal quality level to an application layer.

30. The apparatus of claim 29, further comprising:
means for reporting the at least one signal quality level to an application with a periodicity that is a multiple of the longest Multicast Control Channel (MCCH) periodicity.

31. The apparatus of claim 29, further comprising:
means for configuring an application to request the at least one signal quality level with a periodicity that is a multiple of the longest Multicast Control Channel (MCCH) periodicity.

32. The apparatus of claim 18, further comprising:
means for reading the MCS information for a Multicast Control Channel (MCCH) of an MBSFN area from a cell System Information Block 13 (SIB 13).

33. The apparatus of claim 18, wherein the combined signal quality estimate includes signal quality of one or more Multimedia Broadcast and Multicast Services (MBMS) services.

34. The apparatus of claim 33, wherein the combined signal quality estimate including the signal quality of the one or more MBMS services is reported to an application at the UE that activated the one or more services.

35. An apparatus for communication comprising:
at least one processor configured to:
determine a signal quality estimate for each of two or more overlapping Multimedia Broadcast Single Frequency Network (MBSFN) areas based on Signal to Noise Ratio (SNR) information and Modulation and Coding Scheme (MCS) information for the MBSFN area; and
determine a combined signal quality estimate based on the signal quality estimates of the MBSFN areas; and
a memory coupled to the at least one processor.

36. The apparatus of claim 35, wherein the at least one processor is further configured to:
measure SNR for a plurality of MBSFN subframes when receiving one or more Multimedia Broadcast and Multicast Services (MBMS).

37. The apparatus of claim 35, wherein the at least one processor is further configured to:
measure SNR of a unicast signal received from a serving base station when in a Multimedia Broadcast and Multicast Services (MBMS) idle mode.

38. The apparatus of claim 35, wherein the at least one processor is further configured to read the MCS information for each MBSFN area from a Multicast Control Channel (MCCH) for the MBSFN area.

39. A computer program product for wireless communication by a user equipment (UE) comprising:
a non-transitory computer-readable medium comprising instructions for:
determining a signal quality estimate for each of two or more overlapping Multimedia Broadcast Single Frequency Network (MBSFN) areas based on Signal to Noise Ratio (SNR) information and Modulation and Coding Scheme (MCS) information for the MBSFN area; and
determining a combined signal quality estimate based on the signal quality estimates of the MBSFN areas.

40. The computer program product of claim 39, wherein the computer-readable medium further comprises instructions for:
measuring SNR for a plurality of MBSFN subframes when receiving one or more Multimedia Broadcast and Multicast Services (MBMS).

41. The computer program product of claim 39, wherein the computer-readable medium further comprises instructions for:
measuring SNR of a unicast signal received from a serving base station when in a Multimedia Broadcast and Multicast Services (MBMS) idle mode.

42. The computer program product of claim 39, wherein the computer-readable medium further comprises instructions for:
reading the MCS information for each MBSFN area from a Multicast Control Channel (MCCH) for the MBSFN area.

* * * * *